United States Patent
Lupini et al.

(10) Patent No.: US 9,789,828 B2
(45) Date of Patent: Oct. 17, 2017

(54) ASSEMBLY OF INJECTION-MOLDED CARRIER AND INSERT(S) CONTAINING HEAT-EXPANDABLE RESIN COMPOSITION

(71) Applicant: HENKEL AG & CO. KGAA, Duesseldorf (DE)

(72) Inventors: Michael Lupini, Milford, MI (US); Peter Sharpe, Metamora, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/734,071

(22) Filed: Jun. 9, 2015

(65) Prior Publication Data

US 2015/0266433 A1 Sep. 24, 2015

Related U.S. Application Data

(63) Continuation of application No. PCT/IB2013/003208, filed on Dec. 18, 2013.

(Continued)

(51) Int. Cl.
*B60R 13/08* (2006.01)
*B29C 61/04* (2006.01)
(Continued)

(52) U.S. Cl.
CPC ............ *B60R 13/08* (2013.01); *B29C 45/006* (2013.01); *B29C 61/04* (2013.01); *B62D 29/002* (2013.01);
(Continued)

(58) Field of Classification Search
CPC . B60R 13/08; B60R 2013/0807; B29C 61/04; B62D 29/002; B62D 29/043
(Continued)

(56) References Cited

U.S. PATENT DOCUMENTS 6,093,358 A * 7/2000 Schiewe ............. B29C 44/1214
264/250
6,103,341 A * 8/2000 Barz ....................... B29C 44/18
277/605

(Continued)

FOREIGN PATENT DOCUMENTS

EP 1707477 A1 10/2006
JP 2001062833 A * 3/2001
(Continued)

OTHER PUBLICATIONS

International Search Report for PCT/IB2013/003208 mailed Jun. 5, 2014. All references cited in the International Search Report are listed herein.

(Continued)

*Primary Examiner* — Edgardo San Martin
(74) *Attorney, Agent, or Firm* — Mary K. Cameron (57) ABSTRACT

An assembly useful for providing structural reinforcement and/or sound/vibration damping to a hollow member of a motor vehicle is provided which contains an injection-molded carrier made of a heat resistant thermoplastic composition, at least one of the first side and the second side of the carrier has at least one receptacle adapted to receive and retain an insert comprised of a heat-expandable resin composition. The carrier may have a plurality of openings in at least one of the first side or the second side forming a grid or lattice and the assembly may include a mounting member adapted to fasten the carrier to an interior wall of a hollow member.

19 Claims, 5 Drawing Sheets

Related U.S. Application Data (60) Provisional application No. 61/738,453, filed on Dec. 18, 2012.

(51) Int. Cl.
| | | |
|---|---|---|
| *B62D 29/00* | (2006.01) | |
| *B29C 45/00* | (2006.01) | |
| *B62D 29/04* | (2006.01) | |
| *E04B 1/84* | (2006.01) | |
| *B60R 13/00* | (2006.01) | |
| *B29C 61/00* | (2006.01) | |
| *B29K 77/00* | (2006.01) | |
| *B29K 101/10* | (2006.01) | |
| *B29K 105/04* | (2006.01) | |
| *B29L 22/00* | (2006.01) | |
| *B29L 31/30* | (2006.01) | |
| *B29L 31/00* | (2006.01) | |

(52) U.S. Cl.
CPC .............. *B62D 29/043* (2013.01); *E04B 1/84* (2013.01); *B29K 2077/00* (2013.01); *B29K 2101/10* (2013.01); *B29K 2105/04* (2013.01); *B29K 2995/0012* (2013.01); *B29L 2022/00* (2013.01); *B29L 2031/3002* (2013.01); *B29L 2031/721* (2013.01)

(58) Field of Classification Search
USPC .................................................. 181/295, 204
See application file for complete search history.

(56) References Cited

U.S. PATENT DOCUMENTS

| | | | | |
|---|---|---|---|---|
| 6,131,897 A * | 10/2000 | Barz | ................... | B62D 29/002 269/207 |
| 6,311,452 B1 * | 11/2001 | Barz | ................... | B62D 29/002 296/207 |
| 6,550,847 B2 * | 4/2003 | Honda | ................ | B29C 44/1228 296/146.6 |
| 6,619,009 B2 * | 9/2003 | Lupini | ................ | B29C 44/1276 52/373 |
| 6,988,585 B2 | 1/2006 | Mourieras et al. | | |
| 7,290,828 B2 * | 11/2007 | Kosal | ..................... | B29C 44/18 264/273 |
| 7,469,459 B2 * | 12/2008 | Kosal | ..................... | B29C 44/18 29/455.1 |
| 8,475,694 B2 * | 7/2013 | Kassa | ................... | B29C 44/18 264/259 |
| 8,530,015 B2 * | 9/2013 | Mendiboure | ........ | B62D 29/002 296/187.02 |
| 8,671,573 B2 * | 3/2014 | Larsen | ................ | B62D 29/002 264/173.16 |
| 9,096,005 B2 * | 8/2015 | Kanie | ..................... | B29C 44/18 |
| 9,259,867 B2 * | 2/2016 | Richardson | ......... | B29C 37/0085 |
| 2002/0164450 A1 * | 11/2002 | Lupini | ................ | B29C 44/1276 428/99 |
| 2004/0011282 A1 * | 1/2004 | Myers | ................ | B60R 13/0892 118/308 |
| 2006/0057333 A1 * | 3/2006 | Brahim | ............... | B29C 44/1214 428/138 |
| 2007/0122510 A1 | 5/2007 | Mendiboure et al. | | |
| 2007/0138683 A1 | 6/2007 | Kanie et al. | | |
| 2011/0277911 A1 * | 11/2011 | Allen | ..................... | B60R 13/08 156/79 |
| 2011/0290585 A1 * | 12/2011 | Allen | ..................... | B60R 13/08 181/294 |
| 2012/0139146 A1 * | 6/2012 | Kanie | ..................... | B29C 44/18 264/46.6 |

FOREIGN PATENT DOCUMENTS

| | | | |
|---|---|---|---|
| JP | 2001199362 A * | 7/2001 | |
| WO | 0055444 A1 | 9/2000 | |
| WO | 2010060241 A1 | 6/2010 | |

OTHER PUBLICATIONS

Written Opinion for PCT/IB2013/003208 mailed Jun. 5, 2014. All references cited in the Written Opinion are listed herein.

\* cited by examiner

ASSEMBLY OF INJECTION-MOLDED CARRIER AND INSERT(S) CONTAINING HEAT-EXPANDABLE RESIN COMPOSITION

FIELD OF THE INVENTION

The invention pertains to devices useful for providing structural reinforcement and/or sound and vibration control within the cavities of hollow members, such as those present in motor vehicles and the like.

BACKGROUND OF THE INVENTION

In recent years, there has been significant and growing interest in the motor vehicle and other industries in the use of various polymer-based foams to stiffen, reinforce, seal or acoustically modify hollow members such as door assemblies, pillars, rocker panels and the like. Quite often, such polymer-based foams are used in combination with carriers which help to control and direct the expansion of the expandable resins used to make such foams and which themselves can assist in achieving the desired structural and acoustic characteristics. However, such carriers typically have to be custom designed for particular end-use applications. Moreover, the amount of expandable resin used generally is considerable, which further adds to the cost of production.

Thus, there remains a need for flexible, versatile universal designs which can be applied to a wide variety of applications and which utilize expandable resins in a cost-effective way to achieve a desired level of performance.

SUMMARY OF THE INVENTION

In one aspect, the invention provides an assembly comprising an injection-molded carrier comprised of a heat resistant thermoplastic composition, wherein the carrier has a first side and a second side, with at least one of the first side or the second side having at least one receptacle adapted to receive and retain an insert comprised of a heat-expandable resin composition.

Another aspect of the invention provides an assembly comprising an injection-molded carrier comprised of a heat resistant thermoplastic composition, wherein the carrier has a first side and a second side, with a plurality of openings in at least one of the first side or the second side forming a grid or lattice, and a mounting member adapted to fasten the carrier to an interior wall of a hollow member and hold the first side or second side of the carrier away from and facing the interior wall.

An assembly of the invention may include one or a combination of two or more of the following features: The heat resistant thermoplastic composition may be comprised of a polyamide. The at least one receptacle may be an opening extending through the carrier from the first side to the second side. The assembly may additionally comprise at least one mounting member extending from the carrier. The carrier may have a grid or lattice structure. The first side and the second side may have a plurality of receptacles each adapted to receive and retain an insert comprised of a heat-expandable resin composition. The at least one receptacle may contain at least deflectable prong adapted to engage a groove on a surface of the insert and retain the insert in place within the receptacle. The carrier may have a plurality of openings extending between the first side and the second side, and the openings may in total comprise at least 50% of the surface area of each of the first side and second side. At least a portion of the openings can be capable of functioning as receptacles adapted to receive and retain an insert comprised of a heat-expandable resin composition. The at least one receptacle may contain an insert comprised of a heat-expandable resin composition. The heat-expandable resin composition may provide a structural reinforcing foam and/or vibration/sound damping foam when activated by heating. One end of the insert may extend beyond the surface defined by a side of the carrier. The insert can be cylindrical in shape and may include a surface groove which extends around the circumference of the insert. The end of the insert which extends beyond a plane defined by a surface of the carrier can be rounded or tapered. At least one of the first side and the second side may have a plurality of receptacles each adapted to receive and retain an insert comprised of a heat-expandable resin composition. The openings in total comprise at least 50% of the surface area of each of the first side and second side. The openings may be separated by walls ranging in thickness from about 1 to about 5 mm. The openings may be separated by walls which extend between the first side and the second side.

In another aspect, the invention provides a method of making an assembly, comprising placing an insert within a receptacle contained in an injection-molded carrier comprised of a heat resistant thermoplastic, wherein the carrier has a first side and a second side, the insert is comprised of a heat-expandable resin composition, and the receptacle is adapted to receive and retain the insert. In one embodiment, the insert may be placed within the receptacle manually or robotically.

In another aspect, the invention provides a method of providing at least one of structural reinforcement, sealing or vibration/sound damping to a hollow member, comprising positioning an assembly according to the invention within the hollow member and heating the heat expandable resin composition to a temperature effective to cause the heat expandable resin composition to expand.

The invention, in yet another aspect, provides a method of providing at least one of structural reinforcement or vibration/sound damping to a hollow member, comprising positioning an assembly (comprising an injection-molded carrier comprised of a heat resistant thermoplastic, wherein the carrier has a first side and a second side, with at least one of the first side or the second side having at least one receptacle containing an insert comprised of a heat-expandable resin composition) within the hollow member and heating the heat expandable resin composition to a temperature effective to cause the heat expandable resin composition to expand.

Also provided by the invention, in another aspect, is a structurally reinforced and/or vibration/sound dampened hollow member, comprising a hollow member within which is present an assembly comprising an injection-molded carrier comprised of a heat resistant thermoplastic, wherein the carrier has a first side and a second side, with at least one of the first side or the second side having at least one receptacle within which is positioned a portion of an expanded resin composition, the portion of expanded resin composition extending from the receptacle and contacting an inner surface of the hollow member, e.g. an inner wall.

An assembly comprising an injection-molded carrier comprised of a heat resistant thermoplastic composition, wherein the carrier has a first side and a second side, with a plurality of openings in at least one of the first side or the second side forming a grid or lattice, and a mounting member adapted to fasten the carrier to an interior wall of a hollow member and hold the first side or second side of the carrier away from an exterior wall and away from and facing the interior wall.

Also provided by the invention, is a hollow member within which is present an assembly according to the invention.

DETAILED DESCRIPTION OF THE INVENTION

The carrier component of the assembly is comprised of a heat resistant thermoplastic composition and may be formed by injection molding the thermoplastic composition. The carrier component has a first side and second side, which are generally opposite to each other. Once the assembly is positioned within a cavity of a hollow member, one or both of the first side and the second side may face an interior wall of the hollow member (e.g., the first side may face a first interior wall and the second side may face a second interior wall). One or more receptacles are present on one or both of the first side and the second side. The receptacles are adapted to receive and retain inserts. In one embodiment, one of the first side or the second side contains a plurality of such receptacles. In another embodiment, both the first side and the second side each contain a plurality of receptacles. The carrier typically has a thickness between the first side and the second side. The thickness may be uniform, such that the first side and the second side are generally parallel to each other, or may be variable, such that the first side and the second side are not parallel to each other. Generally, the carrier thickness is within the range of from about 1 to about 10 cm. As viewed from the first side or the second side, the carrier may be of any desired shape, such as, for example, square, rectangular, hexagonal, trapezoidal, circular, oval, triangular, or the like or irregular in shape. In one embodiment, the carrier is sized and shaped so as to fit within the cavity of the hollow member within which it is placed. For example, the carrier thickness may be selected so that when the carrier is positioned within such cavity at least one of the first side and the second side of the carrier substantially parallels the inner surface, e.g. an inner wall, of the hollow member which it faces, the distance between the carrier side and the inner hollow member surface being, for example, about 1 to about 5 cm. The surface defined by the first side or the second side may be of any suitable geometry, such as flat (planar), curved (e.g., concave, convex) or angular.

The carrier may be unitary, such that it is a single integral part which has been molded from a thermoplastic composition into the desired form and configuration. In another embodiment, however, the carrier may comprise a plurality of carrier portions which are separately formed (by injection molding, for example) and then joined together to provide the carrier to be used in the assembly of the present invention. Such joining together of the carrier portions may be achieved by any suitable means such as mechanical interlocking of the carrier portions, clips which hold adjacent carrier portions together, adhesives, screws and the like. The individual carrier portions may be identical to each other or different from each other. Since different end-use applications for the assemblies may have different requirements with respect to the size of the carrier component, standard carrier portions may be provided which may be joined together in different ways to provide carriers of different size and configurations. For example, if a standard carrier portion has a first side and an opposite second side which are 10 cm by 10 cm square, four such portions may be joined together to provide a 20 cm by 20 cm square carrier or a 10 cm by 40 cm rectangular carrier, depending upon the requirements of a particular application (e.g., the interior dimensions and shape of a hollow member to be structurally reinforced and/or dampened).

The thermoplastic composition employed in the body of the carrier is selected and formulated such that it is capable of being injection molded to provide a relatively rigid, dimensionally heat stable material. Any of the heat resistant thermoplastics known in the art may be utilized as part of the thermoplastic composition, including engineering thermoplastics. In one embodiment, the thermoplastic composition comprises a polyamide. Nylon 6,6 is an example of a suitable polyamide. The thermoplastic composition may contain any of the additives known in the art, including, for example, fillers (e.g., glass fiber), stabilizers, impact modifiers, colorants, processing aids, and the like. In one embodiment of the invention, a thermoplastic composition is selected which provides a carrier capable of withstanding a temperature of at least 121° C. for at least 30 minutes without exhibiting any dimensional distortion.

One or both of the first side or the second side of the carrier may be characterized by the presence of at least one opening, and more preferably a plurality of openings. In one embodiment of the invention, at least one opening, and preferably a plurality of openings, is configured to function as a receptacle (i.e., an opening adapted to receive and retain an insert comprised of a heat-expandable resin composition). In another embodiment, however, the carrier does not contain any openings capable of functioning as insert receptacles. Such openings may pass entirely through the body of the carrier from the first side to the second side (forming a through hole) or alternatively may be blocked off or constricted at some point or points along its length. In one embodiment, the openings pass through the carrier and are configured such that the carrier when viewed from the first side or the second side resembles an open grid or lattice (e.g., a rectangular grid, a honeycomb grid). The openings may be of any suitable cross-sectional shape such as square, rectangular, hexagonal, circular, triangular, trapezoidal or the like. The openings may be the same as, or different from, each other. In one aspect of the invention, the size and number of the openings are such that the openings constitute at least 50%, at least 60% or at least 70% of the surface area of a side, or both sides, of the carrier. However, it will generally be desirable that the openings constitute, in total, not more than 90% or not more than 80% of the surface area of a side, or both sides, of the carrier. Such an arrangement helps to reduce the weight and cost of the carrier, without overly compromising its rigidity or its ability to contribute to the structural reinforcement properties of the assembly after it has been positioned within a cavity of a hollow member and the heat expandable resin composition of the insert(s) activated by heating. The thickness of the walls separating the openings may be varied as may be desired or needed to meet requirements with respect to the ability of a hollow member within which the carrier is positioned to withstand a load or force applied to the hollow member which would tend to crush the hollow member in the absence of the carrier. The wall thickness may, for example, be from about 1 to 5 mm.

The carrier of the present invention is further characterized by containing on its first side or its second side or on both its first and second side at least one receptacle, but advantageously a plurality of receptacles, adapted to receive and retain an insert comprised of a heat-expandable resin composition. The aforementioned openings may be adapted to function as such receptacles. All, or only a portion, of the openings may be so adapted.

Any suitable means for retaining the insert in place in the receptacle may be employed. Advantageously, the insert is retained sufficiently such that the insert does not fall out of the receptacle when the side of the carrier containing the receptacle and insert is held face down or when the assembly is subjected to the handling normally encountered as the assembly is manufactured, stored, shipped, and then installed in a hollow member of a motor vehicle or the like. Retention of the insert may be accomplished, for example, by closely matching the dimensions of the insert and receptacle such that a press fit between these components is achieved, wherein the insert is retained by frictional forces between the surface of the insert and the inner surface of the receptacle. An adhesive may also be employed to attach the insert to the inner surface of the receptacle. In one embodiment, the heat-expandable resin composition used to make the insert may be selected and formulated to have hot melt adhesive or pressure sensitive adhesive characteristics such that the insert itself inherently has adhesive properties capable of retaining the insert in the receptacle. In one advantageous embodiment of the invention, the receptacle contains at least one deflectable prong adapted to engage a groove on a surface of the insert and retain the insert in place within the receptacle. Where a receptacle has more than one deflectable prong, the prongs may be uniformly spaced around the interior of the receptacle. For example, where a receptacle has two deflectable prongs, such prongs may be positioned opposite each other. The deflectable prong(s) may be constructed of a resilient material such that the prong is capable of being deflected from an initial position by application of a force perpendicular to the longitudinal axis of the prong and returning (without application of external force) to the original initial position once that force has been removed. In one embodiment, the deflectable prong is made of the same heat resistant thermoplastic as the carrier (e.g., a glass-filled polyamide or other engineering thermoplastic).

To facilitate manufacture of the assemblies in accordance with the present invention, all of the receptacles present in the carrier may be uniform in size and shape and capable of receiving and retaining one particular type of insert. Also contemplated by the present invention, however, are carriers having two or more different types of receptacles adapted to receive and retain two or more different types of inserts.

The aforementioned receptacles in the carrier are configured to receive and retain inserts comprised of a heat-expandable resin composition. Where an assembly contains a plurality of such inserts, the inserts may be fabricated from the same heat-expandable resin composition or different heat-expandable resin compositions having varying properties and characteristics. The inserts employed in an individual assembly may also have different sizes, shapes, etc. However, for ease of manufacture, in one embodiment the plurality of inserts used to manufacture an assembly are identical.

To simplify insertion of the inserts into the receptacles, each insert may be symmetrical in cross-section such that the insert need not be oriented in one particular manner in order to accomplish such insertion. In particular, the inserts preferably have a circular cross-sectional shape. Generally speaking, the cross-sectional shape of the insert closely matches the cross-sectional shape of the receptacle, such that the insert fits snugly within the receptacle. It will also generally be advantageous for the insert to be substantially uniform in cross-section over most of its length, since such an arrangement will again help to facilitate insertion of the inserts within the receptacles. For example, in one embodiment the insert is cylindrical in shape. The ends of the insert may be smaller in cross-section than the main or central body of the insert, however, which helps to guide the insert into the receptacle as it is being inserted. For example, one or both ends of the insert may be tapered or rounded. As previously mentioned, the outer surface of the insert may contain a groove adapted to receive a deflectable prong arranged within the receptacle that is capable of retaining the insert in position within the receptacle. The groove may extend around the entire periphery of the insert surface or, alternatively, extend around less than the entire periphery. In one embodiment of the invention, such groove is positioned at approximately the mid-point of the length of the insert. When the insert is symmetrical about its center point, placing the groove at the mid-point of the insert will result in the final arrangement of the insert when inserted and retained in the receptacle being independent of which end of the insert is inserted into the receptacle. Manufacture of the assembly of this invention can thereby be further simplified.

The overall length of the insert may be adjusted and controlled as may be desired to suit a particular end-use application. In one embodiment, one end of the insert, once inserted and retained in the receptacle of the carrier, extends beyond the surface defined by the first or second side of the carrier. In other embodiments, however, such end may be flush with the surface or even below the surface. The insert length may be selected such that once the insert is placed in the receptacle and the resulting assembly is positioned as desired within a hollow member, the end of the insert extending furthest from the surface defined by the side of the carrier is within a distance of 1 to 5 mm from an interior surface of the hollow member (e.g., the interior surface that the carrier side faces).

The inserts utilized in the assemblies of the present invention are comprised of a heat-expandable resin composition. Heat-expandable resin compositions are well known in the art and typically contain one or more polymers and/or polymer precursors as well as one or more heat-activated blowing agents that cause the composition to expand (foam) when the composition is heated. That is, such heat-activated blowing agents are latent blowing agents in that they are stable at room temperature and are only activated to function as volatile expansion agents when the composition is heated to or above a certain temperature (sometimes referred to as the activation temperature). In one embodiment of the invention, the blowing agent is selected to have an activation temperature above the temperature at which the heat-expandable resin composition is to be shaped into the insert (by injection molding or extrusion, for example). The heat-expandable resin composition may be formulated so that it imparts structural reinforcement properties, sound/vibration damping properties, or both structural reinforcement and sound/vibration damping properties to a hollow member after an assembly containing one or more inserts comprised of the heat-expandable resin composition is placed within the hollow member and activated by heating so as to expand the resin composition.

The heat-expandable resin composition utilized in the inserts of the present invention may be selected from any of the materials known in the art that contain one or more polymers and/or polymer precursors and one or more latent blowing agents and that have sufficient dimensional stability at ambient temperatures so as to permit a structure prepared therefrom to be self-supporting. In one embodiment the resin composition (or at least its outer surface) is substantially non-tacky at ambient temperatures and yet capable of being softened or melted at an elevated temperature so that it can be shaped or formed into the desired configuration by injection molding or the like without activating the latent blowing agent(s). In one embodiment of the invention, the resin composition is resilient. The latent blowing agent may be selected to provide the property of foaming and expanding the resin composition by application of external heating (e.g., temperatures of from about 120° C. to about 220° C., the range of temperatures typically encountered by an automobile body when the finish coatings are baked onto the body) for from about 10 minutes to about 150 minutes. The polymer may be a thermoplastic polymer, rubber (elastomer, including crosslinkable or curable elastomers), and/or thermoplastic elastomer. Suitable thermoplastic polymers include, for example, ethylene-vinyl acetate copolymers, copolymers of ethylene and alkyl(meth)acrylates, polyethylenes, polypropylenes, and polyesters. Suitable rubbers and thermoplastic elastomers include, for example, styrene-butadiene rubbers (SBR), ethylene-propylene rubbers, ethylene-propylene-diene monomer rubbers (EPDM), polybutadienes, styrene-isoprene-styrene block copolymers, styrene-butadiene-styrene block copolymers, styrene-ethylene/butylene-styrene block copolymers, styrene-ethylene/propylene block copolymers, nitrile rubbers, chlorinated polyethylene rubbers, and the like. Polymer precursors, i.e., materials or substances including prepolymers, resins and the like that are monomeric or oligomeric in character that are capable of being cured, cross-linked and/or chain extended upon heating, may also be used, both by themselves as well as in combination with one or more polymers. Examples of suitable polymer precursors include, without limitation, epoxy resins, polyurethane prepolymers, and the like. The resin composition thus may be thermoplastic, thermosettable, or, in one especially desirable embodiment, both thermoplastic and thermosettable (i.e., capable of being shaped or molded at a moderately elevated temperature but also capable of being cured or crosslinked at a higher temperature).

The latent blowing agent or agents present in the polymer matrix causes expansion or foaming of the resin composition when heated to an elevated temperature. The latent blowing agent can be any known blowing agent known in the art, such as, for example, "chemical blowing agents" which liberate gases by decomposition upon heating and/or "physical blowing agents", i.e., expanding hollow beads that expand in volume upon heating (also referred to as expandable microspheres). Combinations of different blowing agents may be used, for example, a blowing agent having a lower activation temperature (e.g., about 100° C.) may be used together with a blowing agent having a higher activation temperature (e.g., about 180° C.). The amount of latent blowing agent is selected so as to provide the desired volume expansion of the resin composition when heated to a temperature effective to activate the blowing agent. The amount of latent blowing agent typically ranges from about 5, 6, 7, 8, 9, 10, 11, or 12 weight percent to about 15, 16, 17, 18, 19 or 20 weight percent of the total resin composition.

Depending on the amount and type(s) of blowing agent(s) used in the resin composition as well as other factors (e.g., the presence of foaming accelerators/activators, the properties of the polymer(s)/polymer precursor(s)), the polymer matrix can be formulated to expand when heated at least about 50 percent, or at least about 100 percent, or at least about 250 percent, or at least about 500 percent, or at least 750 percent, or at least 1000 percent in volume as compared to the initial volume of the heat-expandable resin composition.

Additionally, additives known in the art such as, for example, cross-linking agents, curatives, and the like may be added to the resin composition to promote curing and/or cross-linking of the polymers or polymer precursors. Such cross-linking agents and curatives are selected based on the type(s) of polymers or polymer precursors that are utilized in the polymer matrix. In preferred embodiments of the invention, the cross-linking agent(s) and/or curative(s) are latent, i.e., stable/unreactive at ambient temperatures but activated when the polymer matrix is heated to an elevated temperature. In such embodiments, the polymer matrix is both expanded and cross-linked/cured as a result of such heating. The types of cross-linking agent(s)/curative(s) employed are generally selected so as to be compatible with the other components of the heat-expandable resin composition, in particular the polymer(s) and polymer precursor(s).

Additives known in the art, such as, for example, impact modifiers, stabilizers, stiffeners, fillers, softeners, plasticizers, waxes, antioxidants, pigments, colorants, fungicides, tackifiers, waxes and/or flame retardants may also be present in the heat-expandable resin composition.

Heat-expandable resin compositions suitable for use in the present invention are available commercially, including, for example, the resins sold by Henkel Corporation and its affiliates under the brand names TEROCORE (used primarily for structural reinforcement purposes) and TEROPHON (used primarily for sound and vibration damping purposes).

The inserts may be formed into their desired shape and configuration by any suitable means such as injection molding.

The assembly of the present invention may additionally comprise at least one mounting member. Such mounting member may be adapted to fasten the assembly to an interior surface of a hollow member, such that the assembly is held in the desired position within the hollow member. The mounting member may, for example, be integral with the carrier or alternatively may be fabricated separately and attached to the carrier through adhesive or mechanical means (e.g., clips, rivets, bolts, screws) or the like. For example, the mounting member(s) and carrier may be integrally formed by injection molding a heat-resistant thermoplastic composition. The mounting member may project away from the main body of the carrier in such a manner that the main body of the carrier (containing the inserts) is held away from the interior surfaces of the hollow member in the desired orientation and at the desired spacing from such interior surfaces. For example, in one embodiment a mounting member extends out from the first side and/or the second side of the carrier. In another embodiment, a mounting member extends out from an edge of the carrier. The mounting member includes a means for securing the assembly to the hollow member. Such means are well known in the art and include, for example, clips, so-called "Christmas tree" fasteners, and the like. Such clip or fastener may have engaging projections which are insertable through an opening in the hollow member and which engage the periphery of the outer surface of the hollow member in the vicinity of the opening such that withdrawal of the engaging projections from the opening is hindered, thereby holding the assembly in position.

To assist in positioning the assembly in the desired manner within the hollow member, the assembly may also comprise one or more spacing members which, like the mounting members, project out from a side or edge of the carrier. The spacing members have a length effective to maintain a minimum desired spacing between an interior wall of the hollow member and the main body of the carrier. The spacing members, however, lack means to fasten or physically attach the assembly to such interior wall. Like the mounting member, the spacing member may be integrally formed with the carrier or may be separately attached to the carrier.

The carrier and the inserts may be manufactured separately and then combined to form an assembly in accordance with the invention by inserting the inserts into the desired receptacles of the carrier to the extent necessary to permit the inserts to be retained in the receptacles (thereby permitting the assembly to be handled and transported without the inserts becoming separated from the carrier). For example, if the receptacle contains at least one deflectable prong adapted to engage a groove on a surface of the insert, the insert is inserted into the receptacle to the extent necessary for such engagement to take place. Insertion of the inserts may be performed manually (i.e., by a worker) or robotically, wherein a robot may be programmed to insert multiple inserts into multiple receptacles of a carrier so as to provide a desired pattern of inserts on one or both sides of the carrier.

The assembly comprised of the carrier and one or more inserts may then be positioned within a hollow member where structural reinforcement and/or sound/vibration damping is needed or desired, with the assembly being secured to one or more interior walls of the hollow member using one or more of the aforementioned mounting members. The hollow member may, for example, be a component of a motor vehicle, such as a pillar, rocker panel, door assembly, channel, rail or the like. Typically, the hollow member is fabricated of metal, such as sheet metal. The assembly is then subjected to heating (e.g., a temperature of from about 120° C. to about 210° C.) for an amount of time sufficient to cause the heat-expandable resin composition present in the insert(s) to expand (foam). Upon cooling, a polymeric foam matrix is obtained which imparts the desired structural reinforcement and/or sound/vibration damping characteristics to the hollow member. Generally speaking, the assembly is selected and designed such that upon activation the heat-expandable resin composition expands in volume sufficiently such that it bridges between the carrier and an interior wall surface of the hollow member. In some embodiments, the polymeric foam matrix bonds (adheres) to the interior wall surface. Where a side of a carrier contains multiple receptacles and multiple inserts, the polymeric foam matrix produced by expansion of an individual insert may remain separate from the polymeric foam matrix or matrices produced from each of the other inserts. However, in other embodiments, the inserts may be arranged and the heat-expandable resin composition used in the inserts may expand sufficiently in volume once activated that the polymeric foam matrices produced by two or more adjacent inserts may merge together. In one embodiment, the polymeric foam matrix/matrices and carrier may cooperate so as to completely block off and seal the hollow member.

Figure 1:
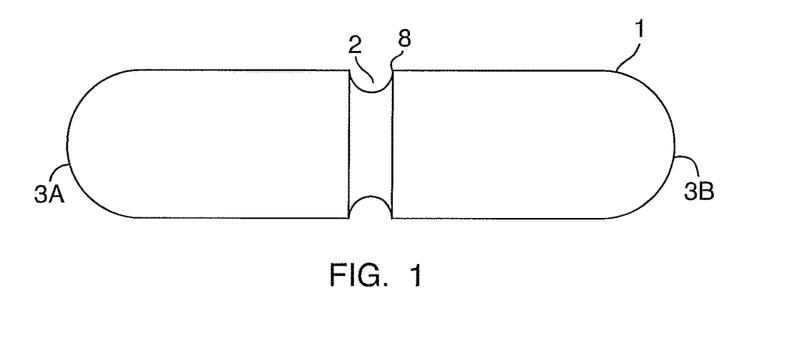
FIG. 1 shows a plan view of an exemplary insert in accordance with one embodiment of the invention.

FIG. 1 illustrates an exemplary insert in accordance with one aspect of the invention. Insert 1 is generally cylindrical in shape, having a circular cross-section and rounded ends 3A and 3B. A groove 2 is present at approximately the mid-point of the length of insert 1, wherein groove 2 is present in the surface of insert 1 and extends around the circumference of insert 1. Groove 2 has a lip 8.

Figure 2:
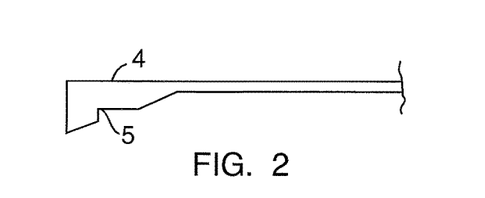
FIG. 2 is a cutaway view of a deflectable prong which may be positioned within a receptacle of a carrier in accordance with one aspect of the invention.

FIG. 2 illustrates a deflectable prong 4 which is positioned within a receptacle (not shown) of a carrier in accordance with an embodiment of the present invention, wherein deflectable prong 4 is adapted to engage groove 2 of insert 1 and retain insert 1 in place within the receptacle. Deflectable prong 4 has a notch 5. The receptacle may, for example, contain two such deflectable prongs, generally arranged facing each other on opposite sides of the interior of the receptacle.

Figure 3:
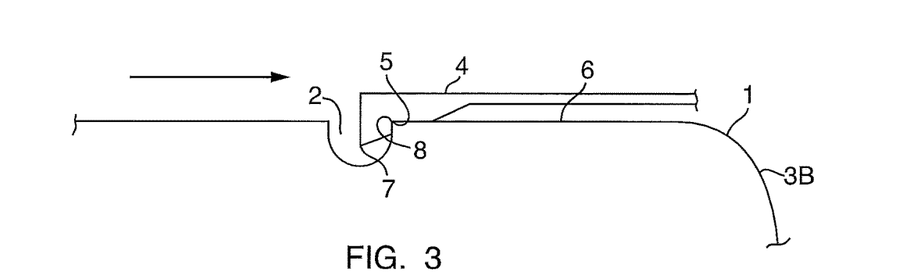
FIG. 3 is a detailed view of portions of the combination of the insert of FIG. 1 and the deflectable prong of FIG. 2.

FIG. 3 illustrates how deflectable prong 4 and groove 2 of insert 1 may interact to retain insert 1 in place within a receptacle (not shown) of a carrier in accordance with an embodiment of the present invention. Insert 1 is inserted into the receptacle in the direction indicated by the arrow, with rounded end 3B being the first portion of insert 1 which is introduced into the receptacle. As the insert is being inserted, one end of deflectable prong 4 is deflected away from insert 1 with tip 7 of deflectable prong 4 sliding along the exterior surface 6 of insert 1. Once tip 7 reaches groove 2, the end of deflectable prong 4, which is constructed of a resilient material, deflects towards insert 1 such that tip 7 enters groove 2. Notch 5 interacts with, i.e. engages, lip 8. As a result, insert 1 is retained in place within the receptacle such that it cannot easily be either inserted further into the receptacle or withdrawn from the receptacle.

Figure 4:
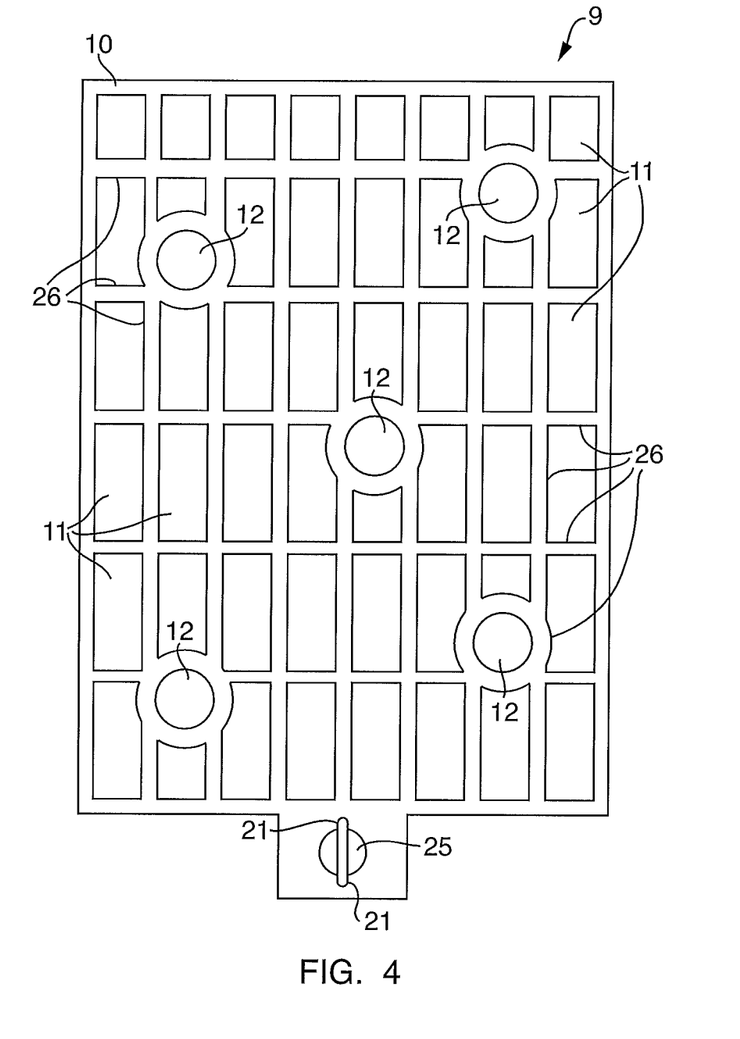
FIG. 4 shows a view of an exemplary carrier in accordance with one aspect of the invention.

FIG. 4 shows a carrier 9 in accordance with an embodiment of the invention. In this figure, the exemplary carrier is being shown in a plan view of first side 10 containing a plurality of both openings 11 and receptacles 12. The receptacles are adapted to receive and retain a cylindrical insert, such as insert 1 illustrated in FIG. 1, through the use, for example of deflectable prongs such as deflectable prong 4 shown in FIG. 2 positioned within the receptacles (such prongs are not shown in FIG. 4). In the final assembly, an insert need not be present in every receptacle of the carrier. Rather, based on the particular end use application desired (e.g., the type of hollow member which is to be reinforced and/or dampened using the assembly, the degree of reinforcement and/damping that is needed in order for the hollow member containing the assembly to meet certain pre-selected criteria), the number of receptacles containing inserts and the pattern of such insert-containing receptacles on one or both sides of the carrier may be varied. Openings 11 lack such deflectable prongs and, in the embodiment illustrated in FIG. 4, are generally rectangular in shape. In this illustrated embodiment, openings 11 and receptacles 12 both extend through carrier 9 from the first side 10 to a second side, the second side thus being in effect a mirror image of the first side. The plurality of openings 11 generally forms an open grid or lattice, thereby helping to reduce the weight of carrier 9 while still providing adequate strength and rigidity. Openings 11 are separated by walls 26 having a thickness of, for example, 1 to 5 mm.

Figure 5:
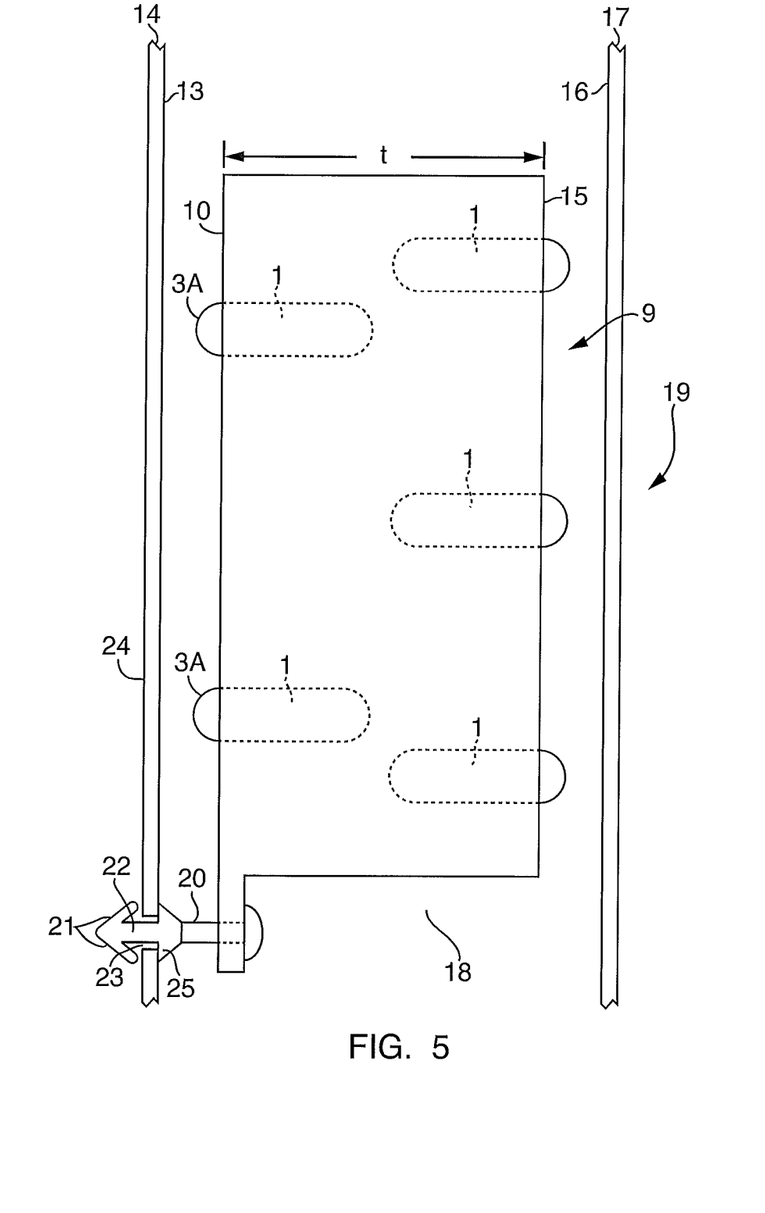
FIG. 5 shows an edge view of the carrier of FIG. 4 positioned with the cavity of a hollow member.

FIG. 5 shows an edge view of the carrier 9 illustrated in FIG. 4, wherein inserts 1 have been positioned in the receptacles 12. First side 10 of the carrier faces towards interior wall 13 of panel 14 and second side 15 of carrier 9 faces towards interior wall 16 of panel 17. First side 10 and second side 15 are separated by thickness "t". Panel 14 and panel 17 together define a cavity 18 of a hollow member 19. Panels 14 and 17 may, for example, be fabricated of sheet metal or the like and one panel, for example panel 17 may be an exterior panel. Carrier 9 is fastened to interior wall 13 of panel 14 using mounting member 20, which has resilient engaging projections 21 which may be deflected towards stem 22 so that a portion of mounting member 20 may be extended through opening 23 in panel 14. Engaging projections 21 spring back into their original position once clear of opening 23 and engage the outer surface 24 of panel 14, thereby inhibiting withdrawal of mounting member 20 from opening 23. Base 25 of mounting member 20 is wider than opening 23 and engages an inner surface, i.e. interior wall 13, of panel 14 so as to further hold the assembly securely in position (i.e., the assembly is attached or fastened to panel 14). When the resin composition present in each insert 1 is activated by heating, inserts 1 expand generally in a direction toward interior walls 13 and 16 such that the resulting expanded polymeric matrix or matrices extend from each side 10 and 15 of carrier 9 to the interior walls 13 and 16. The presence of the expanded polymeric matrix/matrices in the space between carrier 9 and interior walls 13 and 16 serves to structurally reinforce hollow member 19 and/or dampen hollow member 19 against sound and vibration, depending upon the components and characteristics of the heat-expandable resin composition that has been selected for use in inserts 1.

Figure 6:
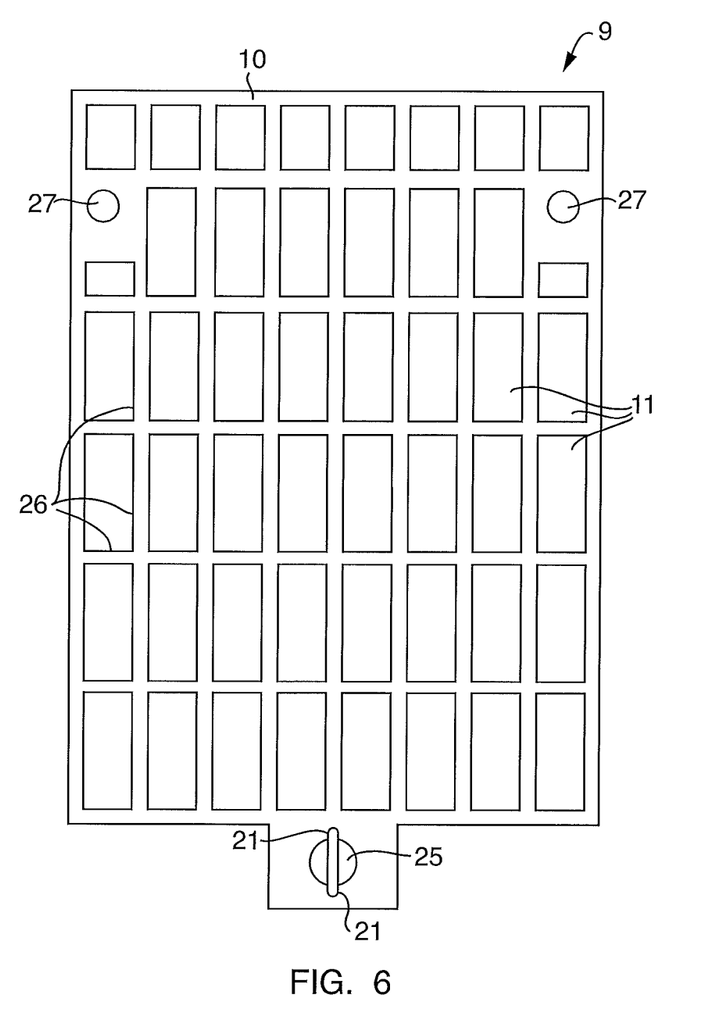
FIG. 6 shows a view of an exemplary carrier in accordance with another aspect of the invention.

FIG. 6 shows a carrier 9 in accordance with another embodiment of the invention. In this figure, the exemplary carrier is being shown in a plan view of first side 10 containing a plurality of rectangular openings 11. A mounting member 20, with engaging projections 21 and base 25, is shown positioned on carrier 9. Optionally, one or more of openings 11 may be adapted to function as receptacles capable of receiving and retaining an insert comprised of a heat-expandable resin composition. Alternatively, openings 11 may have a non-rectangular shape, such as triangular, square, hexagonal or circular. Openings 11 need not all be the same size or shape. In this illustrated embodiment, openings 11 extend through carrier 9 from the first side to a second side, the second side thus being in effect a mirror image of the first side. The plurality of openings 11 generally forms an open grid or lattice, thereby helping to reduce the weight of carrier 9 while still providing adequate strength and rigidity. Openings 11 are separated by walls 26 disposed between the openings 11 and having a thickness of, for example, 1 to 5 mm.

Figure 7:
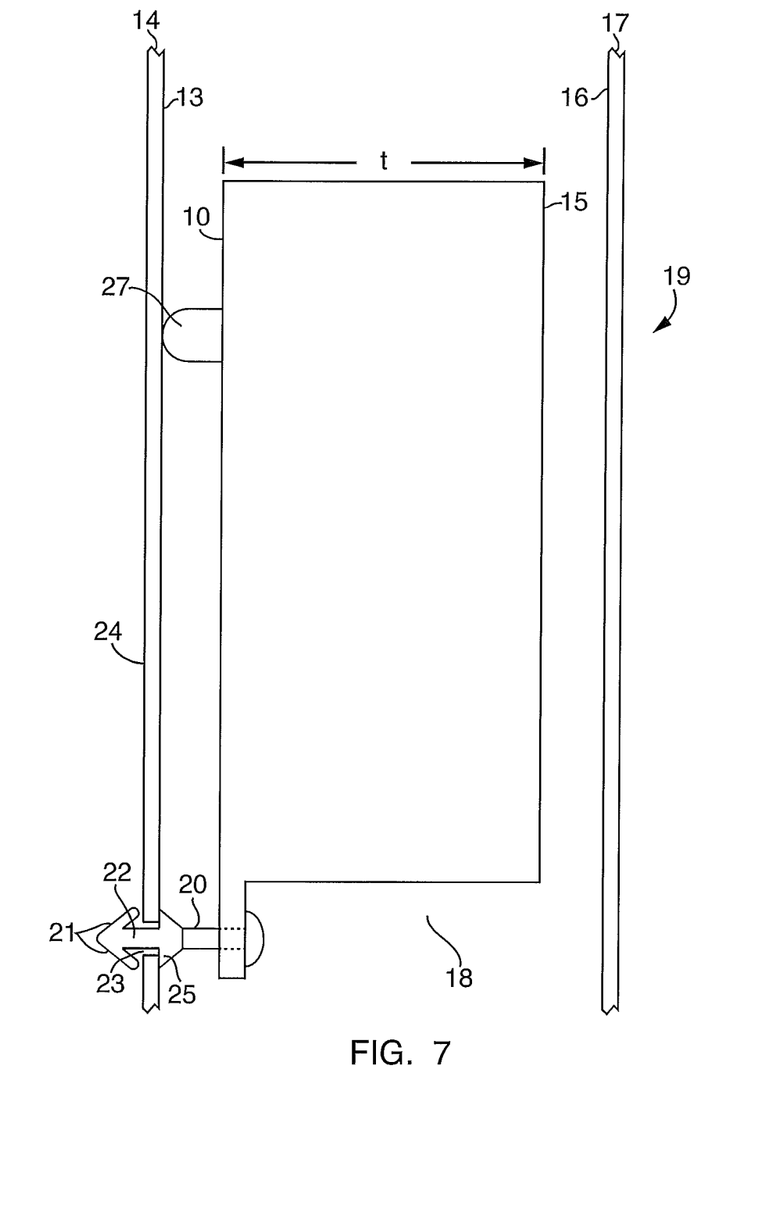
FIG. 7 shows an edge view of the carrier illustrated in FIG. 6.

FIG. 7 shows an edge view of the carrier 9 illustrated in FIG. 6. First side 10 of the carrier faces towards interior wall 13 of panel 14 and second side 15 of carrier 9 faces towards interior wall 16 of panel 17; panel 17 is an external panel. First side 10 and second side 15 are separated by thickness "t" (i.e., the length of the walls 26 separating openings 11 corresponds to thickness "t" of the carrier 9). Panel 14 and panel 17 together define a cavity 18 of a hollow member 19. Carrier 9 is fastened to interior wall 13 of panel 14 using mounting member 20, which has resilient engaging projections 21 which may be deflected towards stem 22 so that a portion of mounting member 20 may be extended through opening 23 in panel 14. Engaging projections 21 spring back into their original position once clear of opening 23 and engage the outer surface 24 of panel 14, thereby inhibiting withdrawal of mounting member 20 from opening 23. Base 25 is wider than opening 23 and engages an inner surface, i.e. inner wall 13, of panel 14 so as to further hold the assembly securely in position (i.e., the assembly is attached or fastened to panel 14). Spacing member 27 projects out from side 10 of carrier 9, having a length effective to keep side 10 spaced a minimum distance from interior surface 13. The presence of carrier 9 between interior walls 13 and 16 serves to structurally reinforce hollow member 19. That is, hollow member 19 will exhibit increased resistance to crushing due to application of a force or load generally perpendicular to panel 14 or 17 as a result of the presence of carrier 9 within the cavity of the hollow member. As FIG. 7 shows the carrier 9 is not physically in contact with panel 17. Due to its grid or lattice structure and the relatively low density of the thermoplastic resin composition used to fabricate the carrier, however, the assembly does not contribute substantially to the weight of the hollow member. Thus, the hollow member may be structurally reinforced in a cost effective manner while maintaining a light weight, as compared to other known approaches for improving the crush resistance of a hollow member (such as increasing the thickness of the metal used to fabricate the hollow member).

While a feature of the present invention may have been described in the context of only one of the illustrated embodiments, such feature may be combined with one or more other features of other embodiments, for any given use.

It will also be appreciated from the above that generating the assemblies disclosed herein and the use thereof also constitute methods in accordance with the present invention. Unless stated otherwise, dimensions and geometries of the various assemblies, and parts thereof, described and shown herein are not intended to be restrictive of the invention, and other dimensions or geometries are possible.

Preferred embodiments of the invention have been disclosed. A person of ordinary skill in the art will recognize that certain modifications also come within the teachings of this invention. Therefore, the following claims determine the scope and content of the invention.

What is claimed is:

1. An assembly comprising an injection-molded carrier comprised of a heat resistant thermoplastic composition, wherein the carrier has a first side and a second side, with at least one of the first side or the second side having at least one receptacle adapted to receive and retain an insert comprised of a heat-expandable resin composition which is cylindrical in shape and has a surface groove which extends at least partially around a circumference of the insert, and wherein the at least one receptacle contains at least one deflectable prong adapted to engage the surface groove of the insert and retain the insert in place within the receptacle.

2. The assembly of claim 1, wherein the at least one receptacle is an opening extending through the carrier from the first side to the second side.

3. The assembly of claim 1, additionally comprising at least one mounting member extending from the carrier.

4. The assembly of claim 1, wherein the carrier has a grid or lattice structure.

5. The assembly of claim 1, wherein both the first side and the second side have a plurality of receptacles each adapted to receive and retain an insert comprised of a heat-expandable resin composition.

6. The assembly of claim 1, wherein the carrier has a plurality of openings extending between the first side and the second side and wherein the openings in total comprise at least 50% of the surface area of each of the first side and second side.

7. The assembly of claim 2, wherein at least a portion of the openings are capable of functioning as the receptacles adapted to receive and retain an insert comprised of a heat-expandable resin composition.

8. The assembly of claim 1, wherein the at least one receptacle contains an insert comprised of a heat-expandable resin composition, which provides a structural reinforcing foam and/or vibration/sound damping foam when activated by heating.

9. The assembly of claim 8, wherein one end of the insert extends beyond a surface defined by at least one of the first side or the second side of the carrier.

10. The assembly of claim 9, wherein the one end of the insert which extends beyond the surface defined by at least one of the first side or the second side of the carrier is rounded or tapered.

11. A method of providing at least one of structural reinforcement, sealing or vibration/sound damping to a hollow member, comprising positioning an assembly according to claim 1 within the hollow member and heating the heat expandable resin composition to a temperature effective to cause the heat expandable resin composition to expand.

12. A hollow member within which is present an assembly according to claim 1.

13. A method of making an assembly comprising placing an insert within a receptacle contained in an injection-molded carrier comprised of a heat resistant thermoplastic, wherein the carrier has a first side and a second side, the insert is comprised of a heat-expandable resin composition, is cylindrical in shape and has a surface groove which extends at least partially around a circumference of the insert, the receptacle is adapted to receive and retain the insert, and the at least one receptacle contains at least one deflectable prong adapted to engage the surface groove of the insert and retain the insert in place within the receptacle.

14. A structurally reinforced and/or vibration/sound dampened hollow member, comprising a hollow member within which is present an assembly comprising an injection-molded carrier comprised of a heat resistant thermoplastic, wherein the carrier has a first side and a second side, with at least one of the first side or the second side having at least one receptacle within which is positioned a portion of an expanded resin composition, the portion of expanded resin composition extending from the receptacle and contacting an inner surface of the hollow member, and wherein the portion of expanded resin composition is obtained by heat-activation of an insert comprised of a heat-expandable composition which is cylindrical in shape and has a surface groove which extends at least partially around a circumference of the insert, the at least one receptacle containing at least one deflectable prong adapted to engage the surface groove of the insert and retain the insert in place within the receptacle.

15. An assembly comprising an injection-molded carrier comprised of a heat resistant thermoplastic composition, wherein the carrier has a first side and a second side, with a plurality of openings in at least one of the first side or the second side forming a grid or lattice, wherein one or more of the openings are adapted to receive and retain an insert comprised of a heat-expandable resin composition, the insert being cylindrical in shape and having a surface groove which extends at least partially around a circumference of the insert, and contain at least one deflectable prong adapted to engage the surface groove of the insert and retain the insert in place within the opening, and a mounting member adapted to fasten the carrier to an interior wall of a hollow member and hold the first side or second side of the carrier away from an exterior wall and away from and facing the interior wall.

16. The assembly of claim 15, wherein the heat resistant thermoplastic composition is comprised of a polyamide.

17. The assembly of claim 15, wherein the openings are separated by walls which extend between the first side and the second side, said walls having a thickness from about 1 to about 5 mm.

18. A method of providing structural reinforcement to a hollow member, comprising positioning an assembly in accordance with claim 15 within the hollow member.

19. The assembly of claim 15, wherein the carrier additionally has a spacing member which projects out from the first side or second side of the carrier and has a length effective to keep the first side or second side spaced a minimum distance from the interior wall.

\* \* \* \* \*